Dec. 16, 1958  J. E. TIERNEY  2,864,188
BREAST TAG
Filed March 5, 1957
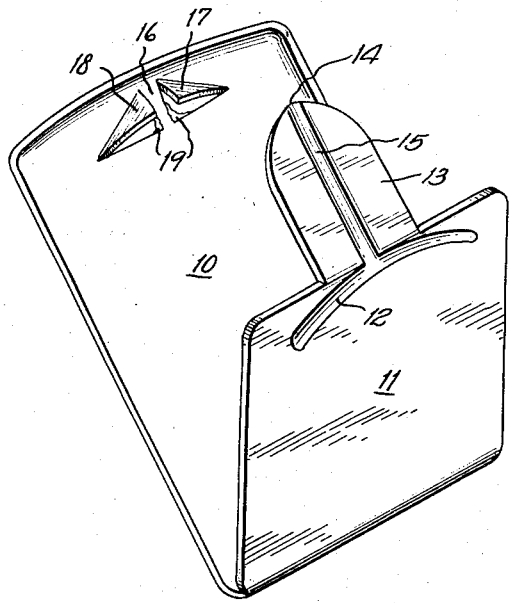
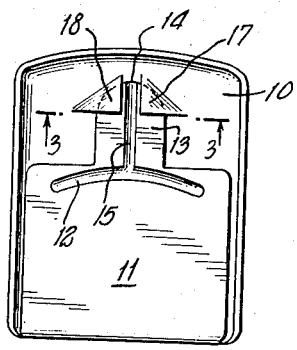
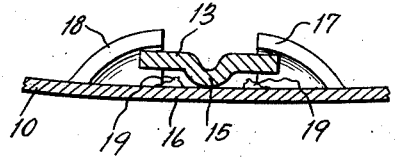
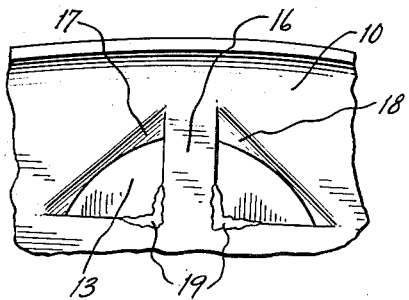
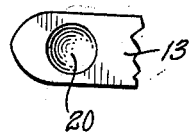
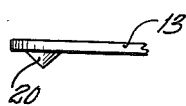
INVENTOR:
JOSEPH E. TIERNEY
BY Robert Henderson
ATTORNEY

United States Patent Office 2,864,188
Patented Dec. 16, 1958

2,864,188

BREAST TAG

Joseph E. Tierney, Ottawa, Ontario, Canada, assignor, by mesne assignments, to E. J. Brooks Company, Newark, N. J., a corporation of New Jersey Application March 5, 1957, Serial No. 644,117

1 Claim. (Cl. 40—3)

This invention is an improvement on copending United States application of Isabel C. Percival and myself, Serial No. 513,373, filed June 6, 1955 (patented June 4, 1957, No. 2,794,278). It has been found that after the dies have been in used for some time burrs are left on the tag at the corners from which the lips are struck. These burrs obstruct the entrance of the tongue under the lips, necessitating an extra effort on the part of the operator when applying the tag to the skin of a bird or the like.

I have found that this can be overcome by forming a longitudinal rib or the like near the point of the tongue, on the side thereof which contacts the bar, so that on closing the tag the rib contacts the bar and raises the sides of the tongue over the burrs.

In the drawings:

Figure 1 is a perspective view of the tag.

Figure 2 is a plan view of the back of the tag when closed.

Figure 3 is an enlarged fragmentary section on the line 3—3 of Figure 2.

Figure 4 is an enlarged fragmentary plan showing the burrs and with the lips cut away.

Figures 5 and 6 are plan and side elevations respectively of an alternative form of the invention.

The tag consists of a main body member 10, at one end of which an upstanding leaf 11 is integrally attached. This leaf has a curved finger stop 12 raised at its upper end. From this upper end an integral tongue member 13 projects more or less parallel to the main body member when the tag is in open position. This tongue member tapers to a blunt point 14 and is provided with a rib 15 on its underside.

Adjacent the free end of body member 10 two right angular slits are made, leaving a solid bar 16 between them and lips 17 and 18, formed by the slits, are upstruck on the underside of body member 10.

When the dies forming this tag have been in use for some time burrs 19 are apt to be left at the angle of the slits forming the bar and lips. These burrs form a resistance to the passage of tongue member 13 along the bar 16 when the tag is being closed. The rib 15 contacting the bar 16 raises the tongue member 13 above the burrs 19 and enables the tag to be closed easily.

Figures 5 and 6 show a modified form of the invention in which a boss 20 is formed near the tip of the tongue member on the underside thereof. This boss contacts the bar 16 when the tag is closed in the same way as rib 15.

Changes within the scope of the invention shown will be apparent to those skilled in the art; it is therefore intended that the disclosure shall not be read in a restricted light except as provided by the following claim.

I claim:

A breast tag comprising a body member, an integral leaf at one end of the body member and bendable relatively to the latter, a tongue member on said leaf at the end thereof remote from the body member and bendable relatively to said leaf, upstruck lips on the body member adjacent the latter's other end and adapted to receive a portion of said tongue member thereunder when the tag is closed, a bar on said body member between said lips in position to block said tongue member against projecting through said body member, and spacing means protruding from one of said members toward the other of said members in such position on said one member as to be effective in advance of the reception of the tongue member under said lips to space said members from each other, said spacing means being a rib on said tongue member extending longitudinally relatively to said bar and extending substantially to the outer end of said tongue member.

References Cited in the file of this patent

UNITED STATES PATENTS

| | | |
|---|---|---|
| 1,249,515 | Schaub | Dec. 11, 1917 |
| 2,246,572 | Canter | June 24, 1941 |
| 2,487,419 | Brooks | Nov. 8, 1949 |
| 2,653,400 | Sutherland | Sept. 29, 1953 |

FOREIGN PATENTS

| | | |
|---|---|---|
| 520,680 | Canada | Jan. 17, 1956 |